UNITED STATES PATENT OFFICE.

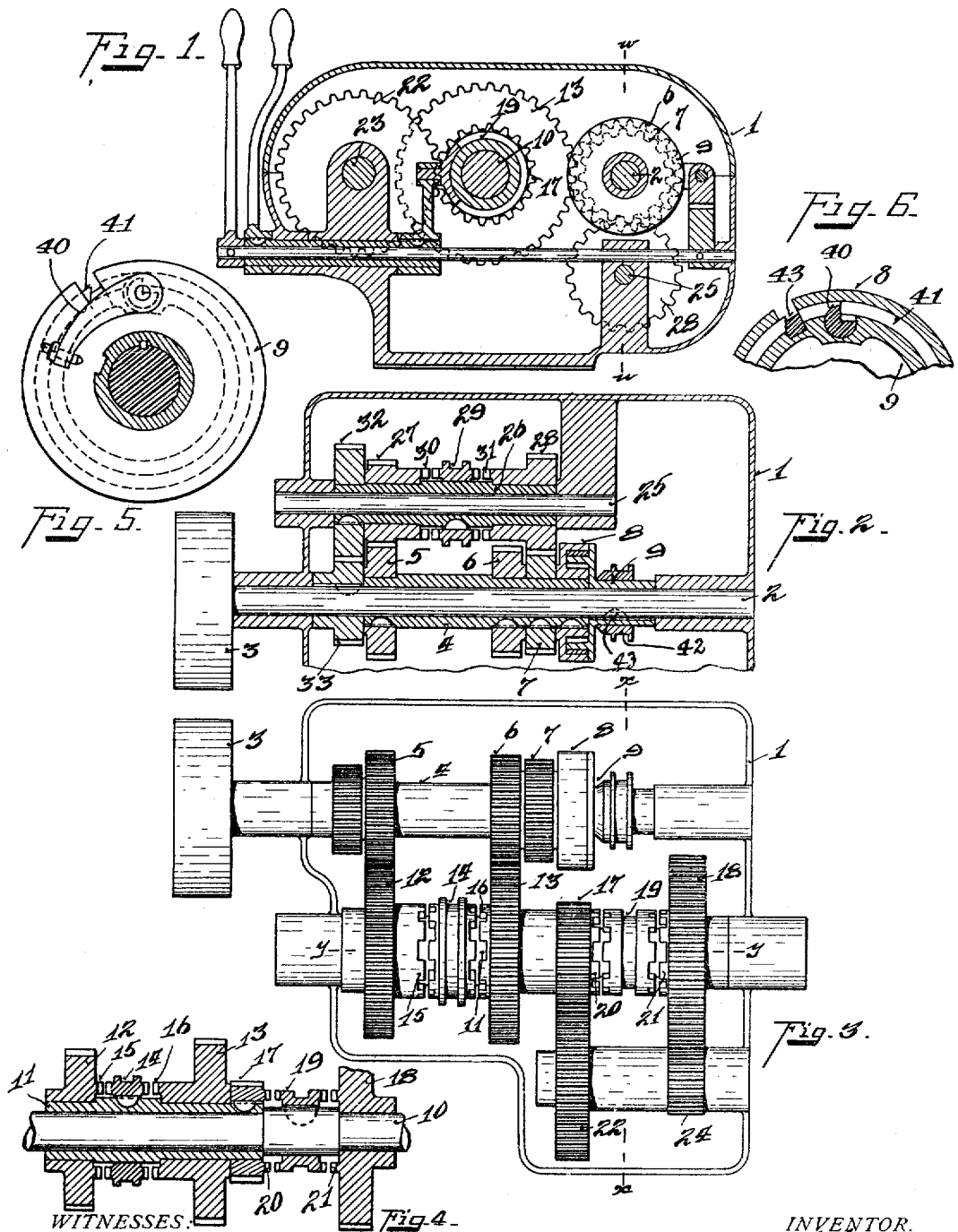

HERMAN W. SCHATZ, OF CINCINNATI, OHIO, ASSIGNOR TO THE AMERICAN TOOL WORKS COMPANY, OF HAMILTON, OHIO, A CORPORATION OF WEST VIRGINIA.

VARIABLE-SPEED MECHANISM.

946,073.

Specification of Letters Patent.   Patented Jan. 11, 1910.

Application filed December 28, 1908.   Serial No. 469,570.

*To all whom it may concern:*

Be it known that I, HERMAN W. SCHATZ, a citizen of the United States, residing at Cincinnati, in the county of Hamilton and State of Ohio, have invented certain new and useful Improvements in Variable-Speed Mechanism, of which the following is a specification.

My invention relates to an improvement in variable speed systems.

The object of my invention is to provide a system of gearing having alternately shiftable clutch devices for producing a variety of speed changes.

The features of my invention are more fully set forth in the description of the accompanying drawings, forming a part of this specification, in which:—

Figure 1 is a section on line x, x, Fig. 3. Fig. 2 is a section on line w, w, Fig. 1. Fig. 3 is a top plan view of my variable speed system of gearing, illustrated as applicable to a head-stock of a lathe. Fig. 4 is a section on line y, y, Fig. 3. Fig. 5 is an end elevation of the friction clutch. Fig. 6 is a central vertical section through a portion of the same.

1 represents the casing provided with bearings for supporting the various shafts employed in the system.

2 represents the driving shaft, and 3 a pulley fixed thereto for driving the same.

4 represents a sleeve loose on shaft 2, carrying gears 5, 6, and 7, fixed thereto.

8 represents a friction clutch member fixed on sleeve 4, and 9 represents a friction clutch member keyed on shaft 2, whereby the friction clutch member and sleeve 4 may be fixed to the shaft 2. The friction clutch employed is constructed in a well known manner in which the member 9 carries a swinging arm 40 adapted to engage against the friction ring 41 seated between a flange projecting from the member 8 and member 9.

42 represents a collar adapted to engage the free end of the arm 40 for locking the ring 41 into frictional contact with the member 8. The ring is secured to the member 9 by a key 43, the collar 42 being suitably actuated by lever mechanism, not shown.

10 represents the driven shaft or spindle, provided with a sleeve 11 loose thereon.

12 represents a gear loose on sleeve 11 and in mesh with a gear 5.

13 represents a gear likewise loose on sleeve 11 and in mesh with gear 6.

14 represents a clutch member slidably fixed to sleeve 11, provided with teeth adapted to engage alternately with the teeth 15 and 16 of gears 12 and 13 respectively.

17 represents a gear fixed to the sleeve 11, and 18 represents a gear loose on shaft 10.

19 represents a clutch member slidably fixed to shaft 10, provided with teeth to alternately engage with teeth 20, 21, formed on gears 17 and 18 respectively, whereby either one of the gears may be clutched to the shaft 10.

22 represents a gear fixed to shaft 23 and in mesh with gear 17, and 24 represents a gear fixed on shaft 23 and in mesh with gear 18.

By throwing clutch member 19 into engagement with the teeth 20 of gear 17, a given speed to shaft 10 can be obtained through a given train of the system; and by throwing clutch 19 into engagement with the teeth 21 of gear 18 a second speed is produced without changing the driving relation of the remainder of gears of the system. In other words, two speed effects can be produced at this point for each train of the system. 25 represents a rod loosely supporting the sleeve 26. 27, 28, represent gears loose on sleeve 26 in mesh with gears 5 and 7 respectively.

29 represents a shifting clutch member provided with teeth adapted to alternately engage with the teeth 30 and 31, formed on the gears 27 and 28 respectively, whereby either one of the gears may be clutched to the sleeve 26.

32 represents a gear fixed on sleeve 26 in mesh with a gear 33 fixed on shaft 2.

It is obvious that clutch members 9 and 29 may be provided with means, not shown, whereby clutch member 29 will automatically be moved to its intermediate or idle position when clutch member 9 is moved to its active position, and vice versa, this being merely as an element of safety to prevent two different trains of gears from being clutched to shaft 2 at the same time.

By the system of gearing herein shown, twelve changes of speed can be imparted to the shaft 10, through the following trains:—

1. Throwing clutch member 9 into clutching position with clutch member 8, connecting sleeve 4 with shaft 2, and throwing clutch member 14 into engagement with gear 12, and clutch member 19 into engagement with gear 17, motion will thence be imparted from shaft 2 through clutch members 8, 9, sleeve 4, gears 5 and 12, to sleeve 11, to shaft 10, through clutch member 19 and gear 17.

2. Throwing clutch 19 into engagement with gear 18 with the remainder of clutches in the position described for the first change, produces a back gear effect to shaft 10, through gears 17, 22, 24 and 18.

3. Leaving clutch member 9 in position and throwing clutch members 14 and 19 into engagement with gears 13 and 17, places the following train in commission:— Shaft 2, clutch members 8 and 9, sleeve 4, gears 6 and 13, sleeve 11 and clutch member 19, through gear 17 to shaft 10.

4. The fourth change is brought about by throwing clutch member 19 into engagement with gear 18, bringing the train of gears 17, 22, 24, and 18 into commission.

5. Releasing clutch member 9 and throwing clutch member 29 into engagement with gear 27, and clutch members 14 and 19 with gears 12 and 17 respectively, places gears 33, 32, 27, 5 and 12 into driving relation with shaft 10.

6. Shifting clutch 19 into engagement with gear 18 brings into commission the back gear speed for the fifth train.

7. Shifting clutch member 14 into engagement with gear 13 and the remainder of clutches in position described for producing the fifth change, will impart motion from shaft 2, through gears 33, 32, 27, 5, 6, and 13 to shaft 10 through clutch member 19.

8. Shifting clutch member 19 into engagement with gear 18 produces the alternate back gear effect for the seventh train.

9. The ninth change is produced by shifting clutch member 29 into engagement with gear 28, clutch member 14 with gear 13, and clutch member 19 with gear 17, whence the motion will be from shaft 2 through gears 33, 32, 28, 7, 6, 13, to shaft 10.

10. Shifting clutch member 19 into engagement with gear 18, produces the back gear speed for the ninth change.

11. Shifting clutch member 29 into engagement with gear 28, clutch member 14 with gear 12, and clutch member 19 with gear 17, produces the eleventh change from shaft 2 through gears 33, 32, 28, 7, 5, 12, to shaft 10.

12. Bringing the back gear train into commission for the change.

Having described my invention, I claim:—

1. A variable speed system of gearing, comprising a driving shaft, a fixed and a series of loose gears thereon, clutching devices for clutching said loose gears to said shaft, a second shaft, a fixed and a series of loose gears thereon in mesh respectively with the gears on said first shaft, means for clutching said loose gears severally to said shaft, a third shaft, and driving connection between one of said loose gears on said first shaft and third shaft, whereby by shifting the clutches three changes of speed may be obtained to said third shaft, substantially as described.

2. In a variable speed system of gearing, a first shaft, a series of gears in driving relation with each other and loose on said shaft, a second shaft, a pair of gears loose thereon, clutching devices for alternately clutching one of said gears to said second shaft, a second pair of gears loose upon said second shaft in mesh with two of the gears respectively on said first shaft, clutching devices for alternately clutching either one of said second pair of gears to one of said first pair of gears, an intermediate shaft and pair of gears in mesh with said first pair of gears respectively on said second shaft, a gear fixed to said first shaft, a third shaft, a gear fixed to said third shaft in mesh with said fixed gear on the first shaft, a pair of gears loose on said third shaft in mesh with two of the gears loose on the first shaft, and clutching devices for clutching either one of said gears to said third shaft, whereby through the shifting of said clutches four primary and four secondary speed changes can be obtained, substantially as described.

3. A variable speed system of gearing comprising four shafts, loose and fixed gears on two of said shafts, and clutching devices for alternately clutching said loose gears to their respective shafts, a series of loose gears on the third shaft, clutching devices for alternately engaging said gears in driving relation with each other and said shaft, and two gears fixed on said fourth shaft in mesh with two of the gears on said third shaft, whereby twelve changes of speed may be imparted to one of said shafts by shifting said clutches, substantially as described.

4. A variable speed system of gearing, comprising a driving shaft, a sleeve concentric with said driving shaft, a series of gears fixed on said sleeve, means for connecting said sleeve to said driving shaft, a second shaft, a series of loose gears thereon in mesh respectively with the gears on said sleeve, means for severally connecting said gears to said second shaft, intermeshing gears fixed respectively on said driving and said second shafts, whereby several changes of speed and one direct drive may be imparted to said sleeve, substantially as described.

In testimony whereof, I have hereunto set my hand.

HERMAN W. SCHATZ.

Witnesses:
 OLIVER B. KAISER,
 S. BECK.